United States Patent [19]
Gifford

[11] Patent Number: 6,052,718
[45] Date of Patent: *Apr. 18, 2000

[54] REPLICA ROUTING

[75] Inventor: David K. Gifford, Weston, Mass.

[73] Assignee: Sightpath, Inc, Waltham, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 08/779,770

[22] Filed: Jan. 7, 1997

[51] Int. Cl.[7] .............................. G06F 13/38; G06F 15/17
[52] U.S. Cl. ..................... 709/219; 709/238; 709/242
[58] Field of Search .................... 709/238, 239, 709/240, 241, 242, 219, 225, 226, 229, 232, 235, 243, 244, 245, 249

[56] References Cited

U.S. PATENT DOCUMENTS

| | | | |
|---|---|---|---|
| 4,987,587 | 1/1991 | Jolissaint | 379/94 |
| 5,088,032 | 2/1992 | Bosack | 395/200.72 |
| 5,345,586 | 9/1994 | Hamala et al. | 395/650 |
| 5,425,090 | 6/1995 | Orriss | 379/201 |
| 5,430,729 | 7/1995 | Rahnema | 395/200.72 |
| 5,463,735 | 10/1995 | Pascucci et al. | 395/200.1 |
| 5,600,794 | 2/1997 | Callon | 395/200.72 |
| 5,664,107 | 9/1997 | Catwani et al. | 395/200.72 |
| 5,774,660 | 6/1998 | Brendel et al. | 395/200.31 |
| 5,812,769 | 9/1998 | Graber et al. | 395/200.12 |

FOREIGN PATENT DOCUMENTS

| | | | |
|---|---|---|---|
| WO 9641285 | 12/1996 | WIPO | G06F 17/30 |
| WO 98/18076 | 4/1998 | WIPO | G06F 9/46 |

OTHER PUBLICATIONS

Cisco Systems, Inc.; "How to Cost–Effectively Scale Web Servers" pp. 1–6, posted Nov. 13, 1996; http://www.cisco.com/warp/public/784/5.html.

Cisco Systems, Inc., "The Effects of Distributing Load Randomly to Servers," pp. 1–18, 1997 or earlier.

Cisco Systems, Inc; "Cisco DistributedDirector"; pp. 1–15, posted Feb. 21, 1997 or earlier; http://www.cisco.com/warp/public/751/distdir/dd_wp.htm.

Cisco Systems, Inc.; "Cisco DistributedDirector"; pp. 1–16, posted Sep. 25, 1996; http://www.cisco.com/warp/734/dist-dir/dd_wp.htm.

Wallace, Bob; "Load balancing juggles calls at busy Web sites"; pp. 1–2, Mar. 17, 1997 or earlier; http://www.computerworld.com/search/AT–html/9611/961111SL46web.html.

Cisco Systems, Inc.; "CiscoAdvantage: Leveraging Intranet and Internet Productivity"; pp. 1–8, posted May 21, 1996; http://www.cisco.com/warp/public/751/advtg/advan_pl.htm.

Gulbransen, A. et al, A DNS RR for specifying the location of services (DNS SRV), pp. 1–9, Feb. 26, 1997 or earlier; http://www.internic.net/rfc/rfc2052.txt.

Davis, C. et al, "A Means for Expressing Location Information in the Domain Name System"; pp. 1–16, Feb. 27, 1997 or earlier; http://www.internic.net/rfc/rfc1876.txt.

Erwin, Blane et al, "Forrester: The Forrester Report," pp. 2–11, Dec. 1, 1996, vol. 11, No. 1; http://access.forrester.com/cgi–bi . . . .

Yoshikawa, Chad et al, "Using Smart Clients to Build Scalable Services," Unisex Association, 1997 Annual Technical Conference, pp. 105–120; Jan. 6–10, 1997 or earlier.

(List continued on next page.)

*Primary Examiner*—Mark H. Rinehart
*Attorney, Agent, or Firm*—Fish & Richardson, PC

[57] ABSTRACT

The present invention is a new method called replica routing that automatically directs client computers that request a service to a server replica for that service. The replica chosen by replica routing is the replica that is expected to provide the best performance to the client based upon the client's location in the internetwork topology and the estimated performance of the internetwork. In addition, the system and method is designed to permit new replicas to be flexibly added undue administrative overhead.

37 Claims, 9 Drawing Sheets

REPLICA ROUTING SYSTEM

OTHER PUBLICATIONS

Open Market, Inc.; Dr. Watson Product Description, "Software Product Description"; pp. 1–8, Jan. 21, 1997 or earlier; http://www.cavebear.com/dwtnda/spd.html.

Open Market, Inc.; "Frequently Asked Questions About Dr. Watson, The Network Detective's Assistant (DWTNDA) Version 1.2," pp. 1–9, Jan. 21, 1997 or earlier; http://www.cavebear.com/dwtnda/faq.html.

Paxson, Vern; "End–to–End Routing Behavior in the Internet"; University of California, Berkeley and Lawrence Berkeley National Laboratory, pp. 25–38, 1996; SIGCOMM '96 Aug. 1996 0–89791–790–1/96/0008.

Tennenhouse, David L. et al, "Towards an Active Network Architecture"; ACM Computer Communications Reviewer; Apr. 1996, vol. 26, No. 2, pp. 5–18.

Chankhunthod, Anawat et al, "A hierarchicla Internet Object Cache"; pp. 153–163, Usenix Technical Conference, Jan. 22–26, 1996.

Crovella, Mark E. et al, "Dynamic Server Selection in the Internet"; pp. 1–5, Jun. 30, 1995; Proc. of the Third IEEE Workshop on the Architecture and Implementation of High Performance Communications Subsystems.

Blaze, Matthew and Alonso, Rafael; "Dynamic Hierarchical Caching in Large–Scale Distributed File Systems"; 0–8186–2865–0 /92 IEEE; pp. 521–528; 1992.

Guyton, James D. et al, "Locating Nearby Copies of Replicated Internet Servers"; Computer Science Dept. University of Colorado, pp. 288–298, 1995; SIGCOMM '95 Cambridge, MA; ACM 0–89791–711–1/95/0008.

Gwertzman, James et al, The Case for Geographical Push–Caching; pp. 1–4, Harvard University; date unknown.

Baentsch, Michael et al, "Introducing application–level replication and naming into today's Web"; Computer Networks and ISDN Systems 28, pp. 921–930, 1996.

Deering, Stephen E. et al, "Multicast Routing in Datagram Internetworks and Extended LANs"; ACM Transactions on Computer Systems, vol. 8, No. 2, pp. 85–110 May 2, 1990.

Bestavros, Azer; "Speculative Data Dissemination and Service to Reduce Server Load, . . . "; Proceedings of ICDE '196, Int. Conf. on Engineering, New Orleans Louisiana, Mar. 1996.

Bestavros, Azer; "Demand–based Document Dissemination to Reduce Traffic and Balance Load in Distributed Information System"; Proc. of SPDP '95, 7th IEEE Symposium, San Antonio, TX, Oct. 1995.

Washburn, K. et al, "TCP/IP Running a Successful Network"; pp. 1–233, and pp. 368–409, Addison–Wesley Publishing Company; date unknown.

Stevens, W. Richard; TCP/IP Illustrated, vol. 1, pp. 1–21, 33–51, 85–142, 186–208, 222–228; Addison–Welsey Publishing Company; date unknown; The Domain Name System, pp. 186–208, TCP: Trans. Control Protocol, 223–228.

Blaze, Matthew A.; "Caching in Large–Scale Distributed File Systems"; Princeton University Department of Computer Science; Research Report CS–TR–397–92, Jan. 1993, pp. 1–88.

Danzig, Peter B. et al, "A Case for Caching File Objects Inside Internetworks"; pp. 1–10, 1993; ACM SIGCOMM.

PointCast, Inc.; "PointCast Ships The Industry's First Broadcast Solution for Corporate Internets"; Oct. 7 1996; 501 Macara Ave.; Sunnyvale, CA 94086.

PointCast, Inc.; "Deployment Guidelines" Techical Paper; May 15, 1997 or earlier; pp. 1–15.

PointCast, Inc.; "Configuring Multiple PointCast I–Servers" Technical Paper; Mar. 19, 1997 or earlier; pp. 1–11.

Alsop, Stewart; "PointCast and Its Wannabes"; Fortune; Nov. 25, 1996, pp. 181–181.

BackWeb Technologies, Inc.; "Put an End to Those Nasty Hit and Runs On Your Website"; 1996.

O'Malley, Sean W. and Peterson, Larry L.; "A Dynamic Network Architecture"; ACM Transactions on Computer Systems, vol. 10, No. 2, May 1992, pp. 110–143.

Huitema, Christian; "Routing in the Internet"; Prentice Hall PTR, Englewood Cliffs, NJ 07632, pp. 1–60, date unknown.

PointCast, Inc., "Internal PointCast Network Traffic"; Technical Paper, Apr. 17, 1997 or earlier; pp. 2–11.

InterVU Network Services; "What We Do"; http://www.intervu.net/service/doit.html; Jun. 8, 1997 or earlier.

Netscape; "Netscape Netcenter"; http://www.netscape.com; 1998 or earlier.

Resonate, Inc.; "Corporate Backgrounder"; pp. 1–10, date unknown; 465 Fairchild Dr., Suite 224, Mountain View, California 94043.

Resonate, Inc. "A Case for Intelligent Distributed Server Management"; pp. 1–9, 1996; http://www.resonateinc.com/dsm.htm.

Resonate, Inc., "Resonate Dispatch™ 1.0: Distributed Server Management Solutions for the Internet"; pp. 1–3; 1996; http://www.resonateinc.com/datasheet.htm.

W3C; "Propagation, Caching and Replication on the Web"; 1996; http://www.w3.org/pub/WWW/Propagation/.

SQUID; "Frequently Asked Questions"; pp. 1–16, 1996; http://squid.nlanr.net/Squid/FAQ.htm.

Wessels, D.; Internet Cache Protocol (ICP), Version 2, pp. 1–7, 1996; http://www.nlanr.net/Cache/ICP/ICP–id.txt.

Internet Middleware Co.; "Cached–3.* Web Cache Datasheet: Beyond Cached–1.4pl2"; pp. 1–2, 1996; http://www.netcache.com/DOC/prod_frame2.html#6.

Survey of caching requirements and specifications for prototype, "Desire: Project Deliverable"; pp. 1–74, 1996; http://www.cc.ruu.nl/–henny/desire/deliveries/del_41.html.

SQUID; Release Notes—1.1 .txt,V 1.11; pp. 1–5; http://squid.nlanr.net/Squid/1.1beta/Release–Notes–1.1.txt; Dec. 5, 1996.

Bowman et al., "The Harvest Information Discovery and Access System," hppt://141.142.3.70/SDG/IT94/Proceedings/ . . . , 1994.

Luotonen et al., "World–Wide Web Proxies", Apr. 1994.

Kwan et al., "NCSA's World Wide Web Server: Design and Performance," IEEE, 1995.

Malpani et al., "Making World Wide Web Caching Servers Cooperate," http:/bmrc.berkeley.edu/papers/1995/138/paper–59.html, 1995.

Routing Basics, http://www.ics.muni.cz/cisco/data/doc/cinternet/ito/55171.htm, 1995.

Jeffery et al., "Proxy–Sharing Proxy Serves," IEEE, 1996.

Oguchi et al., "A Study of Caching Proxy Mechanisms Realized on Wide Area Distributed Networks," IEEE, 1996.

Ross, "Hash Routing for Collections of Share Web Caches," IEEE Network, Nov. 1997.

REPLICA ROUTING SYSTEM

REPLICA ROUTING HIEARCHY

REPLICA ADVERTISEMENT REGISTRATION

REPLICA ADVERTISEMENT REGISTRATION

REPLICA ROUTING WITH REDIRECTS

REPLICA ROUTING WITH REDIRECTS

REPLICA ROUTING WITH CLIENT APPLETS

REPLICA ROUTING WITH CLIENT APPLETS

INTERNETWORK PERFORMANCE DISCOVERY

REPLICA ROUTING

BACKGROUND OF THE INVENTION

This invention relates in general to an internetwork replica routing system and more particularly relates to a system for directing a client computer to a server replica that is estimated to provide good performance for the client computer.

The recent rapid growth of users of international public packet-switched computer internetworks such as the Internet has created a large demand for the information and services they contain. The replication of services in an internetwork makes it possible for such services to service many users.

Certain known approaches for automatically directing client computers to servers include, for example, round robin DNS and loading balancing DNS, which direct users to one of a number of server replicas in an attempt to balance the load among many servers. In another approach called multiple hostnames, content is spread over multiple servers, each with a separate hostname. Web pages returned to users contain links that point at the replica that has been selected for the user based on load-balancing concerns and replica content considerations. In another approach called Internet load balancing, a hardware component automatically distributes user requests sent to a single IP address to one of a number of server replicas to implement load balancing. Another approach is resonate dispatch that combines load balancing with replica capability to automatically direct users to a replica that is operational, is not overloaded with requests, and contains the requested information.

SUMMARY OF THE INVENTION

The invention provides a network server replication system that uses a new method called replica routing to automatically direct a client computer to a server replica that will perform well for the client given the location of the client in the internetwork. More specifically, client computers contact a replica router that transparently redirects them to a server replica in the internetwork that will perform well given the client's network location and the estimated performance of the internetwork.

The replica routing provided by the invention allows a client computer to access key replicated information near the location of its use in the internetwork. In particular, once an appropriate server replica is established, replica routing according to the invention automatically directs clients that are "nearby" in the internetwork to that particular replica, thereby providing high-performance access to the replicated server. For example, the invention will enable high-performance access to network applications, such as video, that are highly sensitive to the delay and bandwidth that are introduced by network components such as network links and network routers. This high-performance access is especially important given that public computer internetworks typically include switching, transmission, and host computer components controlled by many individuals and organizations.

In certain embodiments each server replica creates a replica advertisement that summarizes information about its location in the internetwork and its observation of the local internetwork topology and performance. A server replica automatically passes its replica advertisement into the replica routing system. The replica router relies upon replica advertisements supplied by each server replica and other optional measurements to route a client computer to one or more server replicas. New replicas can be flexibly added without undue administrative overhead.

As the number of server replica grows it may become impractical or inefficient for every replica router for a service to contain the replica advertisements for all server replicas. One particular method for replica routing according to the invention allows replica routers to be optionally arranged in a hierarchy, and for replica advertisements to be propagated only part way up the replica router hierarchy. During the replica routing process client requests are automatically sent down the hierarchy until they reach a replica router that is sufficiently knowledgeable about a replica's internetwork location to make an informed replica routing judgment. Thus, not all of the replica advertisements for a particular service have to be contained in a single replica routing server.

A second reason for introducing a hierarchy of replica routers is for security concerns. Since a replica advertisement can contain sensitive information about internetwork characteristics and topology, an organization can choose to create a private replica router inside of a private internetwork (an intranet) to contain this information. In one particular embodiment of the invention, client requests from inside of the intranet will be automatically directed to this private replica router, while client requests from outside of the intranet will use other replica routers that do not need to know the detailed advertisements for replicas they cannot access.

In another aspect of the invention, a client applet can assist in the replica routing process. The client applet can determine certain characteristics of the client internetwork environment, and send these to the replica router as additional information to aid the routing process. The replica router can return more than one replica address to the client applet, and the client applet can then perform empirical performance experiments to choose the best server replica for the use of the client.

Numerous other objects, features, and advantages of the invention will appear from the following description taken together with the drawings.

DETAILED DESCRIPTION

Figure 1:
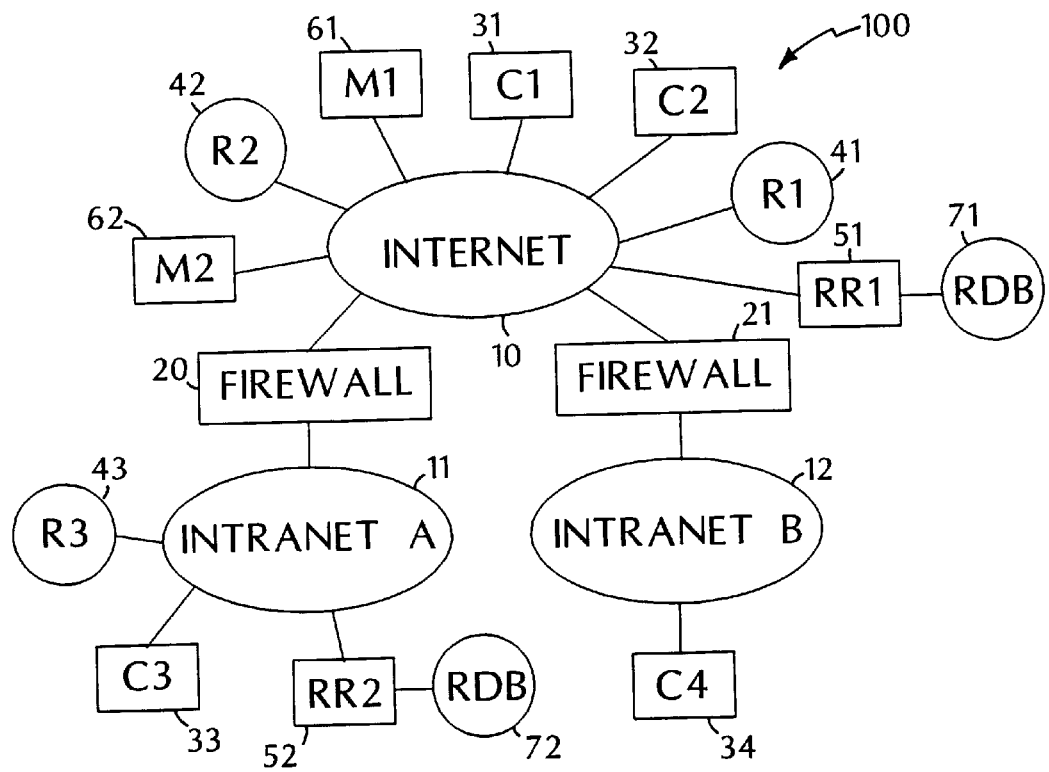
FIG. 1 is a block diagram of a replica routing system according to the invention.

A replica routing system 100 as shown in FIG. 1 employs public internetwork 10 and intranets 11 and 12 protected by firewalls 20 and 21 to interconnect a plurality of client computers 31, 32, 33, and 34, server replicas 41, 42, and 43, replica routers 51 and 52, and master servers 61 and 62. Each replica router 51 and 52 has a corresponding replica routing database 71 and 72. A user of the system employs a client computer 31, 32, 33, 34 to access services provided by master servers 61, 62 and server replicas 41, 42, 43, and is directed to an appropriate server replica by one or more replica routers 51, 52. Client computers can include user workstations and proxy servers. Master servers 61, 62 are used to service certain update requests that are not processed at server replicas 41, 42, 43, such as purchasing of goods or user registration that requires the synchronized updating of shared databases. Replica routers, server replicas, and master servers can be implemented on separate computers as shown, or can share computers. For example, a replica router, a server replica, and a master server can exist on the same computer.

The contents of server replicas 41, 42, 43, 44 can be dynamically maintained by a network-based replication method, such as a master-slave scheme or weighted voting, or replicas can be updated by digital broadcast either over the network or by separate multicast or broadcast channels such as satellite or terrestrial links. Alternatively, replicas can either be partially or totally implemented by media that can be physically distributed such as optical disk.

The software architecture underlying the particular preferred embodiment is based upon the hypertext conventions of the World Wide Web. The Hypertext Markup Language (HTML) document format is used to represent documents and forms, and the Hypertext Transfer Protocol (HTTP) is used between client, replica router, server replica, and master server computers. Documents are named with Uniform Resource Locators (URLs) in the network of computers. A document can be any type of digital data broadly construed, such as multimedia documents that include text, audio, and video, and documents that contain programs. In particular, Java applets and ActiveX controls can be contained in or referenced by documents that allow the capabilities of client computers to be automatically extended by the downloading of new programs.

In addition to documents, server replicas can be used to replicate any type of data, including relational databases, multimedia data, video files, and groupware data. To support access to these datatypes server replicas and master servers can support a variety of standardized protocols in addition to or instead of HTTP, such as standard remote procedure call protocols, database interfaces such as ODBC, and Microsoft's Distributed Common Object Model (DCOM) and their successors.

Server replicas can also replicate programs that are used to generate dynamic content. When a server replica receives from a client and processes an HTTP request for the URL of such a program, the program is executed, and the program produces dynamic content that is returned to the client. HTTP POST data can also be sent to dynamically executed programs using the same URL-based mechanism. Thus, server replicas can be used to produce dynamic content and process client data as well as serve static content. This program replication and dynamic program invocation mechanism can also be employed with other standardized communication protocols.

Server replicas can optionally process certain update and transaction requests and relay them to other server replicas or master servers. For example, a shared project page could be updated at one server replica, and this update could be automatically propagated to all other replicas. Alternatively, form submissions for hard-good orders could be spooled to a file, by a server replica, and then sent at predetermined intervals to a master server for further processing.

The network architecture underlying one particular embodiment is TCP/IP and the family of IP routing procedures. Background on this network technology can be found in *TCP/IP Illustrated* by Stevens (1994, Addison-Wesley, Reading, Mass.), *Routing in the Internet* by Huitema (1995, Prentice Hall, Englewood Cliffs, N.J.), and "End-to-End Routing Behavior in the Internet" by Paxson (1996, SIG-COMM '96 8/96 CA, USA). The term network is used herein to refer to both networks and subnetworks. The term network number or network identifier is used to refer to the IP address of a network including both its network and subnetwork components.

Figure 2:
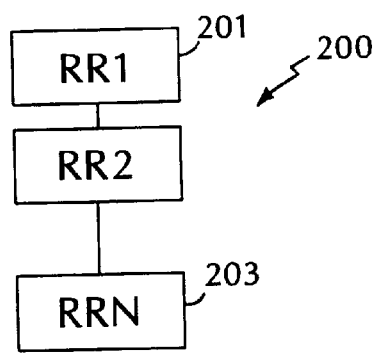
FIG. 2 is a diagram of a replica routing hierarchy.

FIG. 2 shows an example hierarchy 200 of replica routers, with router 201 being a root replica router, and with router 203 being a leaf replica router that contains replica advertisements for server replicas in its network neighborhood. More than one replica router can exist at each level of the hierarchy, and there can be multiple root replica routers. The IP addresses of the root replica routers are bound to the DNS name of the service, such as "www.pathfinder.com."

Before discussing how replica routers operate to direct client computers to server replicas that provide good performance for the client computers, this discussion will describe how a client computer or server replica can "discover" its local internetwork topology. Then this discussion will describe how this technique is used in connection with the replica routing system of the present invention.

Figure 6:
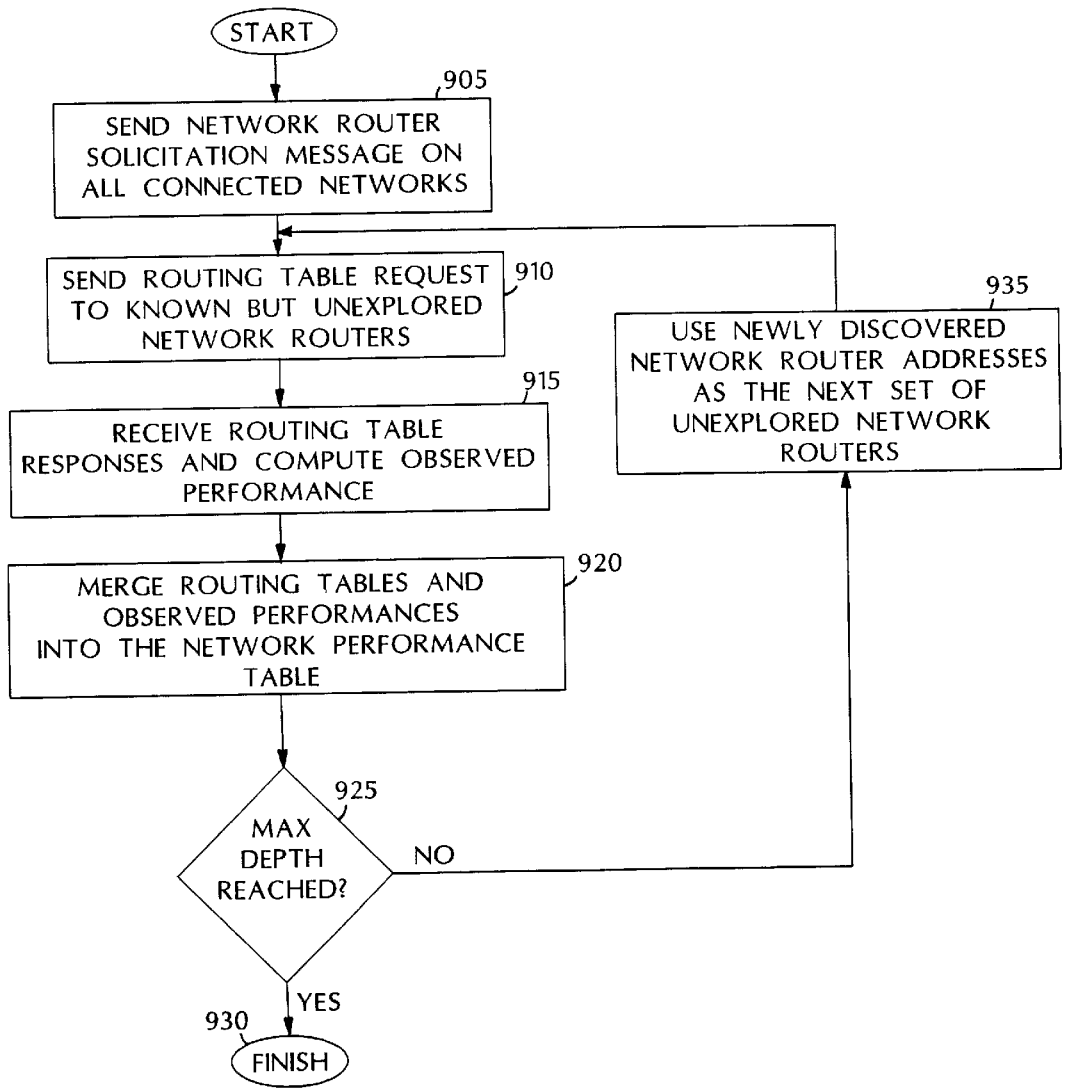
FIG. 6 is a flow chart illustrating a process for determining internetwork performance in a neighborhood of adjustable size.

FIG. 6 is a flowchart for the discovery of local internetwork topology and performance. All routing protocols that are in use on the internetwork are employed, including the Routing Information Protocol (RIP), External Gateway Protocol (EGP), Boarder Gateway Protocol (BGP), Open Shortest Path First (OPSF), Classless Interdomain Routing (CIDR), and their descendants and follow-ons. At step 905 a client computer (or a server replica) sends a network router solicitation message on all connected networks by broadcast or multicast to learn of nearby network routers (standard network routers are not to be confused with the replica routers according to the invention).

At step 910, network routing table request messages are sent to all of the network routers discovered in step 905, along with any well-known or preconfigured network routers. Responses (routing tables) from the network routers are received by the client computer at step 915. At step 920 the client computer derives from the routing tables the expected performance from the client's network to all of the networks specified in the received routing tables and records this information in a network performance table. The network performance table is a list of rows, in which each row contains a network number, a net mask, and an estimate of the performance from the client to the network number (e.g., an estimate of bandwidth). A net mask (sometimes called a subnet mask) specifies which portions of an IP address contain network and subnetwork identifiers and thus should be matched to a second IP address to determine whether the two addresses are on the same network. Each network performance table entry also includes the net mask for the destination network as reported by the routing table. If no net mask is reported by a network router in a destination network, then a default net mask based on the class of the destination network's IP address (which is inferred from the initial digits of the address) is used, or another pre-specified set of rules is used. If more than one network router offers a route to a distant network, the client computer records only the best-performing route in the performance table. A single metric for replica routing "performance" is used, such as estimated bandwidth. For example, if a particular RIP network router reports the number of network hops it requires to reach a distant network, rather than the estimated bandwidth required to reach the distant network, the number of hops can be converted to estimated bandwidth by simply reducing bandwidth from an ideal fixed maximum by a fixed amount for each hop reported. Alternatively, if the address of a router on a distant network is discovered in the information received at step 915, it can be "pinged" to attempt to estimate the network performance from the client to the distant network. At step 925 if a configuration-set maximum number of iterations has not been exceeded, then at step 935 all of the network routers that were named in the routing tables received at step 915 that were not previously explored are assembled, and this set of new routers is used at step 910 to learn more about the network neighborhood. Otherwise, at step 930, internetwork performance discovery is completed, yielding a network performance table that is a list of rows, in which each row contains a network number, a net mask, and an estimate of the performance to that network number.

In an alternative embodiment, the maximum depth (maximum number of iterations) explored for a given network router can depend on the network router (e.g., well-known network routers can have a greater maximum depth). In another alternative embodiment, more than one network performance metric can be utilized (such as bandwidth and latency).

Multiple types of network numbers can be used simultaneously in a network performance table, and thus multiple types of network numbers can be used in replica routing databases, including IP network numbers, IPng (next generation) numbers, and their successors.

In an alternative implementation, the network performance map is extended by using a traceroute utility to perform traceroutes to preconfigured IP addresses and to the IP addresses of server replicas. Traceroute utilities are described in *TCP/IP Illustrated, Vol.* 1, Chapter 8: "Traceroute Program," Stevens (1994, Addison-Wesley, Reading, Mass.). Server replica addresses can be discovered by contacting root replica routers and other replica routers and asking them with a specialized request to transmit their list of server replica and replica router addresses. The use of traceroute can uncover information that is not available from routing table inquiries.

Figure 3A:
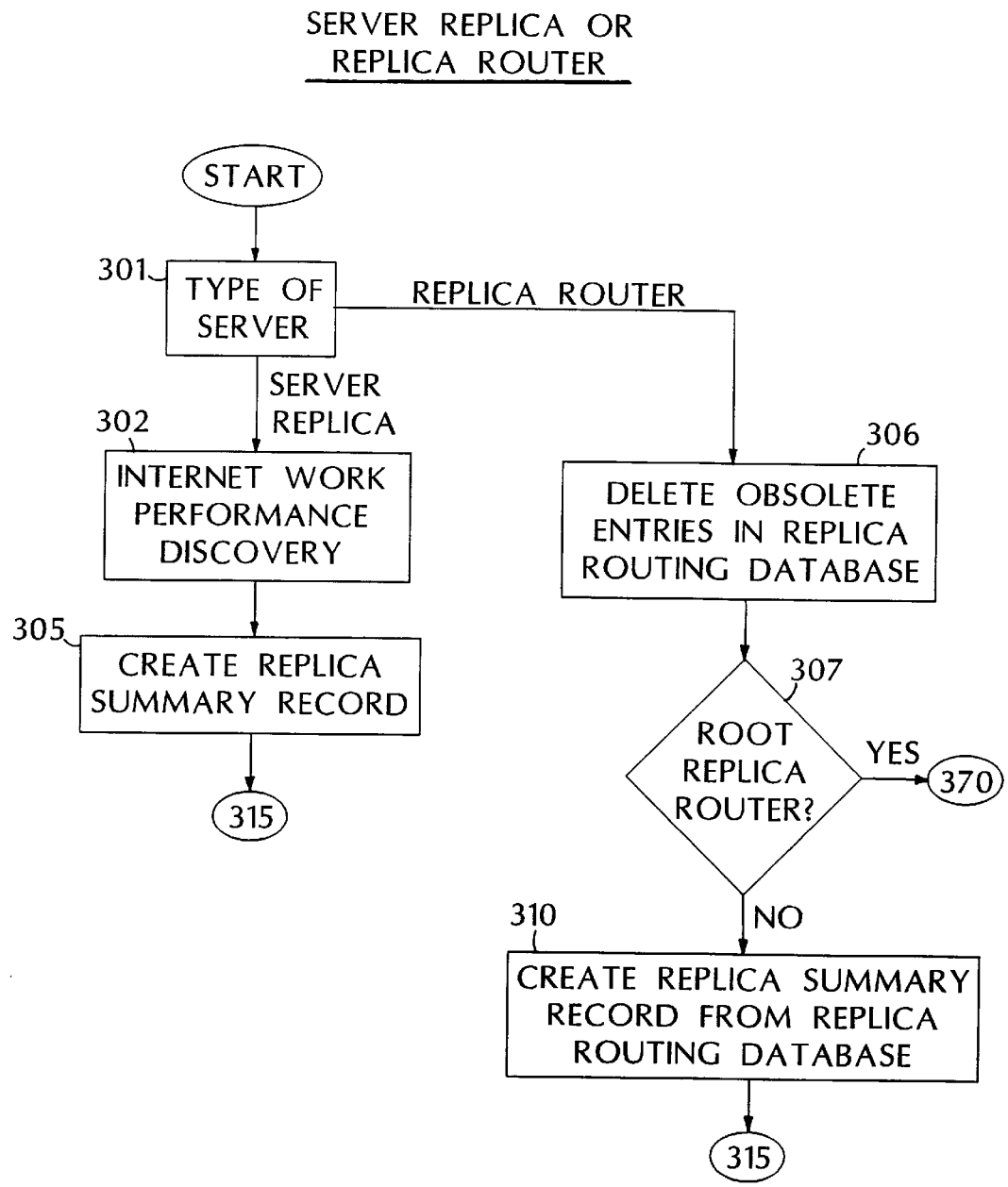
FIGS. 3a–3c is a flow chart illustrating the creation of a replica advertisement and the processing of a replica advertisement by replica routers.
Figure 3B:
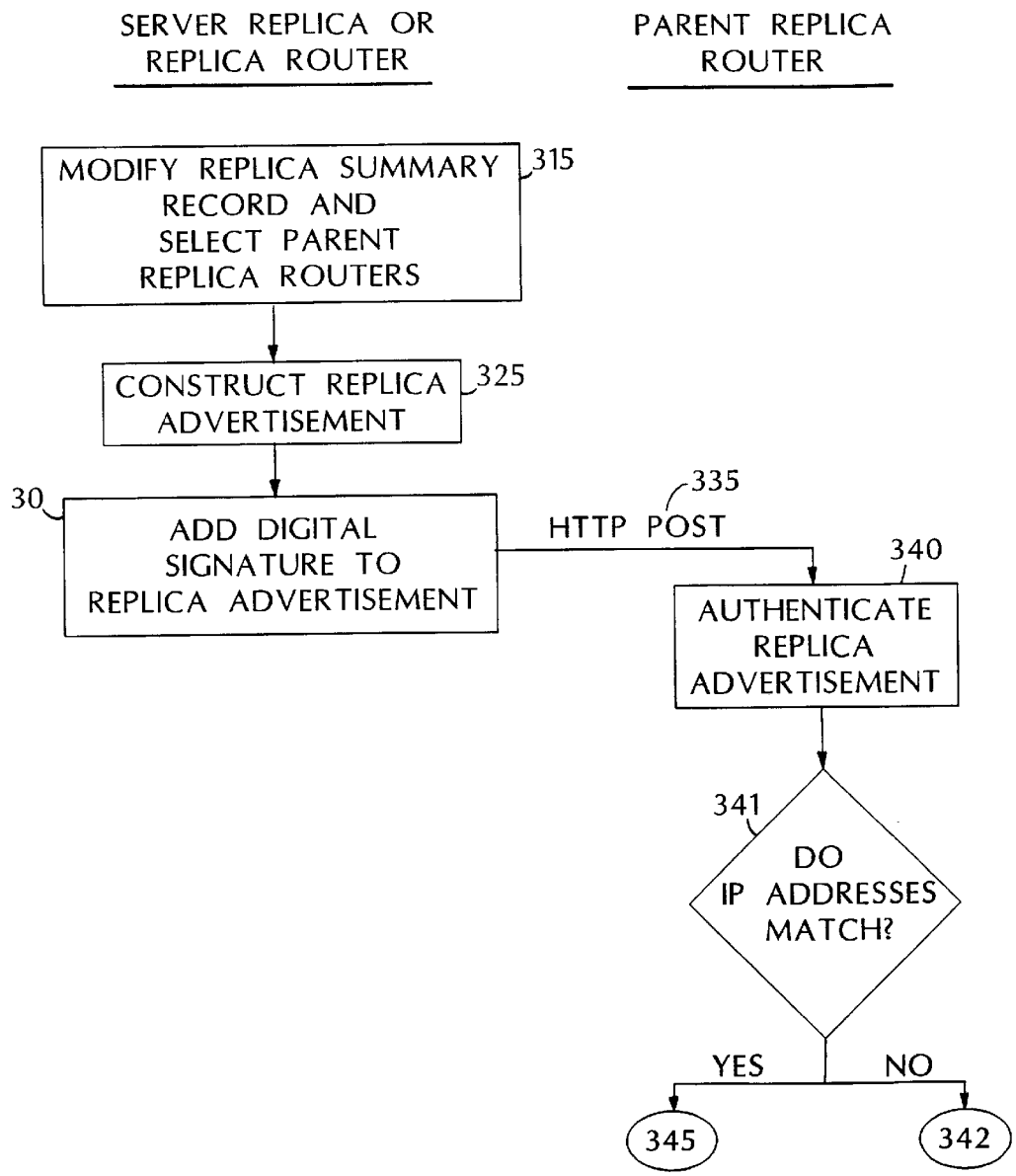
Figure 3C:
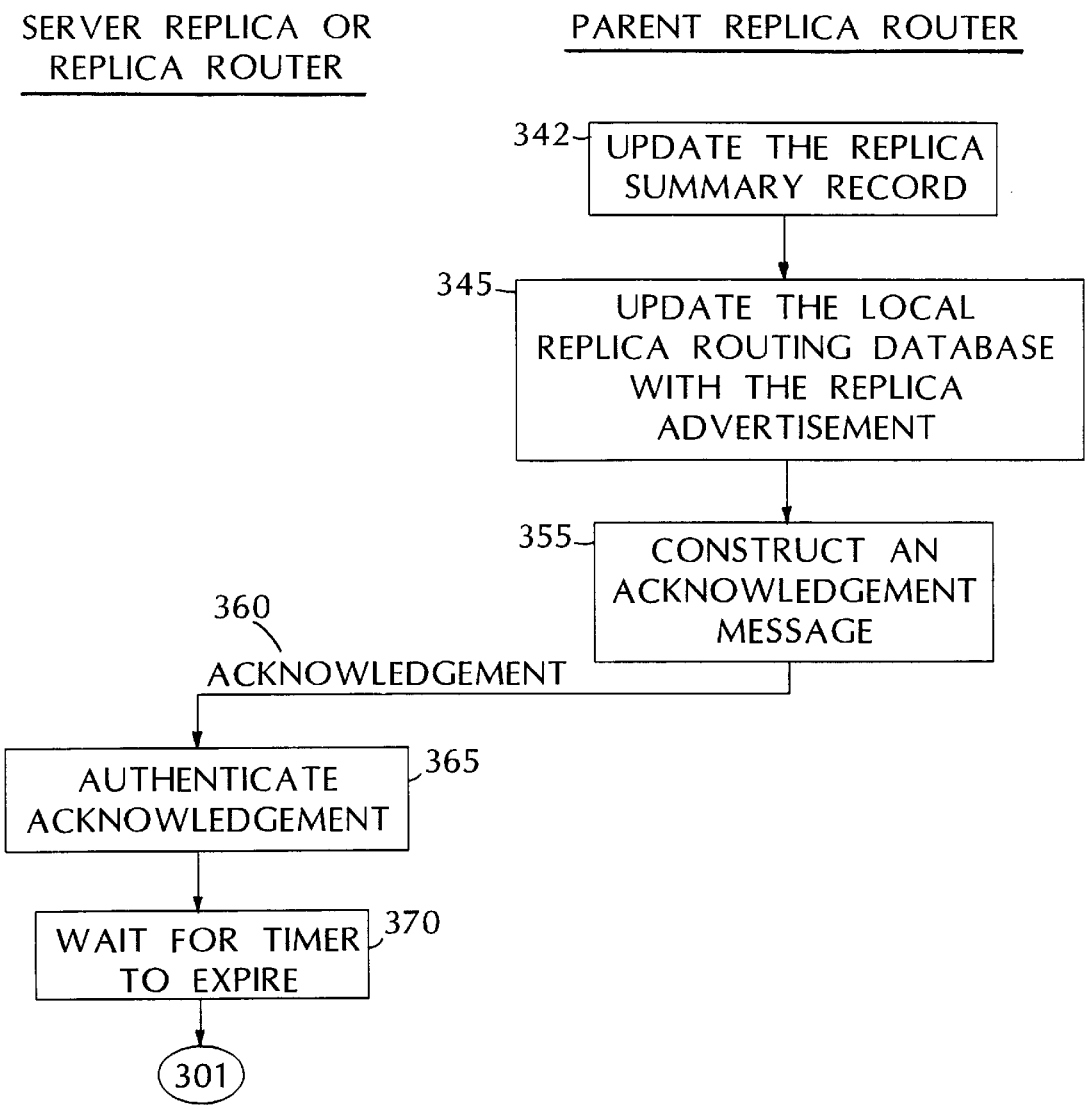

FIGS. 3a–3c is a flowchart that describes the operation of server replicas and replica routers, including the creation of replica advertisements. A key concept in the operation of this system is that server replicas and replica routers both perform the functions of selecting parent replica routers and sending "advertisements" to the parent replica routers that include information concerning the server replica's or replica router's address in the internetwork as well as local internetwork topology and performance estimates derived from server replicas or replica routers.

At step 301, if a particular computer is a server replica, control is transferred to step 302, and if it is a replica router, control is transferred to step 306.

At step 302 a server replica creates a network performance table using the method presented in FIG. 6. At step 305 the server replica creates a replica summary record that has one entry for each network it can reach. Each replica summary record entry contains: a network number, the network's net mask from the network performance table (see FIG. 6), an estimate of the performance to the network from the network performance table, and the current time as a timestamp. The entire replica summary record is marked as being created by a server replica.

Alternatively, if a particular computer is a replica router, then at step 306 the replica router scans its replica routing database and deletes any replica summary record entries that have a timestamp that is older than a configuration-set time limit. At step 307 a test is made to see if this replica router is configured as a root replica router. If so, then control is transferred to step 370 and the root replica router does not create an advertisement (because the root replica router has no parent to which it can send an advertisement). If this replica router is not a root replica router, then at step 310 the replica routing database is used to create a new replica summary record that has multiple entries, one for each network number advertised in a replica summary record in the replica routing database. Each entry in the newly created replica summary record includes: a network number, the net mask for that network number, the best performance metric value for that network number that is advertised in a replica summary record by any server replica or replica router, and the timestamp from this best performing entry in the routing database. The newly created replica summary record is marked as being created by a replica router.

At step 315 logic common to the replica routers and server replicas begins, and the new replica summary record can be modified according to operator-specific rules that are specific to the replica router or server replica. Arbitrary alterations to the new replica summary record can be specified, including: the removal of certain networks; the addition of network numbers with specified network masks, performance metric values, and timestamps that can include a "do not expire value"; manual override, by network number, of network masks and performance metric values or replica summary record entries; and removal of replica summary record entries that do not achieve a specified performance metric value. In this way the operator of a server can ensure that the server serves its intended audience, for example by adding intranet network numbers that cannot be seen from outside the intranet's firewall. Next, the replica router or server replica selects a set of parent replica routers. The addresses of the parent replica routers are initialized by looking up the replica routers bound to the service's DNS name (such as "www.pathfinder.com"). Alternatively, the set of parent replica routers can be manually configured for more involved hierarchies.

In an alternative embodiment, server replicas contain the same basic information, but are specialized with local features such as having their content in a foreign language or having buyer-location-specific prices. In this embodiment, a server replica's advertisement is altered in 315 as described above to offer to service network numbers that are in a geographical area, e.g., a country, or administrative domain, e.g., a company, regardless of whether these network numbers are actually close to the server replica, to cause client routing to server replicas to be based on content specialization. In particular, the network numbers that the server replica wishes to service can be added to the network numbers ordinarily advertised as being close to the server replica's location (if the network numbers that the server replica wishes to service are different from the numbers advertised as being close to the server replica's location), or the numbers ordinarily advertised are deleted. For example, a server replica having content in the French language could offer to service network numbers that are in France. In this example, when multiple servers offer to service networks in France, then performance metric values will be used to choose the best one for a client request.

Once the set of parent replica routers is determined their addresses are stably recorded for later use.

At step 325 a replica advertisement is constructed that includes the replica summary record, the IP address of the local computer, and the current time. A digital signature is added to the replica advertisement at 330 that is based upon a service-specific private key known to all replicas and replica routers of a service, and the completed replica advertisement is sent to the parent replica routers in HTTP POST message 335.

After a parent replica router receives the replica advertisement message 335, at step 340 it authenticates the replica advertisement using the public key of the service. Once the advertisement is authenticated, at step 341 a check is made to ensure that the IP address in the advertisement is the same as the source IP address in the header of message 335. If the IP addresses match, control continues at 345, otherwise control continues at 342.

At step 342, if the IP addresses do not match, it means that the replica advertisement has traveled through a firewall (see FIG. 1). The multiple-entry replica summary record in the replica advertisement has a single entry added that includes: the source IP address in the header of message 335, a net mask of all bits "1," a default network metric value, and the current time. This additional entry is added to the summary because the added IP address will be identical to the IP addresses of requests made by clients from behind the same firewall, and thus will match the IP addresses of these client requests. This new replica summary record is marked as having been created by a replica router.

At step 345 the replica advertisement is added to the local routing database at the parent replica router if the advertisement has a more recent timestamp than a previous replica advertisement in the routing database from the same IP address specified in the replica advertisement. Replica advertisements that are superseded by newer advertisements are deleted.

An acknowledgment message is constructed at step 355 that contains the IP address contained in the advertisement, the timestamp, and a digital signature using the service private key. The acknowledgment message 360 is authenticated by the sending server replica or replica router at step 365, and a timer is set at step 370 to refresh the registration information at a configuration-determined interval. When the timer expires, control of the server replica or replica router returns to step 301.

In an alternative embodiment, replica routers regularly "ping" the servers that are described by replica advertisements in their replica routing databases. Servers that do not respond have their advertisements removed unless their replica summary record contains an entry that has a net mask consisting entirely of "1"s, which indicates that the server is behind a firewall.

Figure 4A:
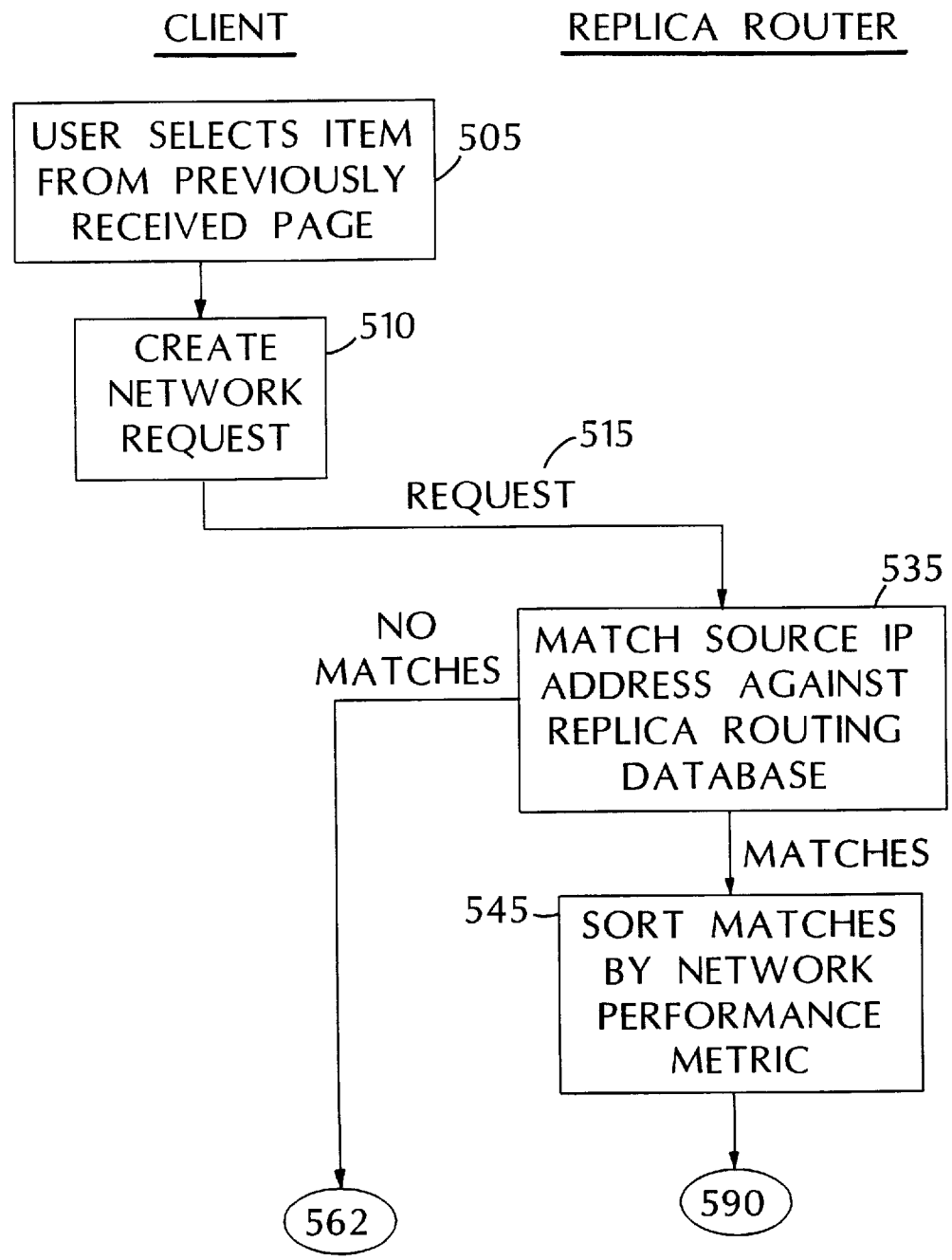
FIGS. 4a–4b is a flow chart illustrating the processing of a client request to a replica router that results in the client being redirected to another replica router or a server replica.
Figure 4B:
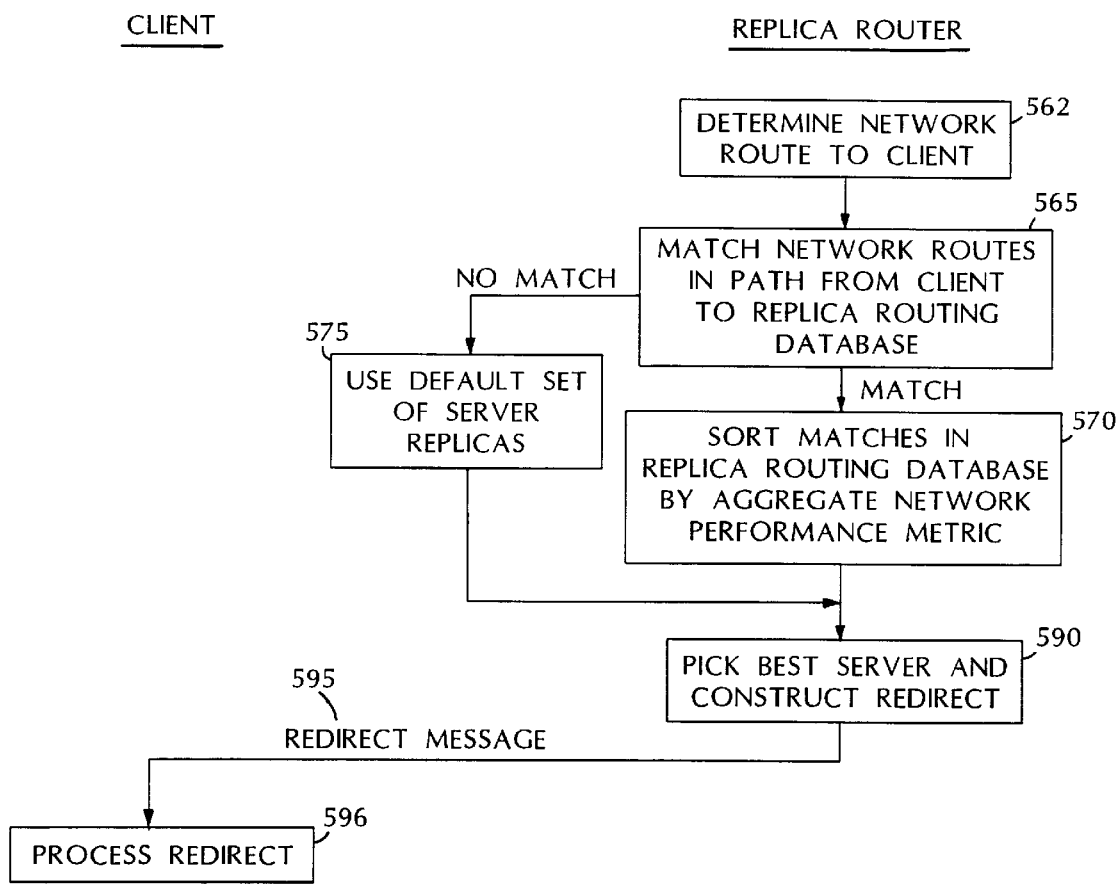

FIGS. 4a–4b shows a flowchart that describes the process of forwarding a client computer to a server replica using HTTP redirects. At step 505 a user selects an entry from a previously received HTTP page that contains a URL that refers to a replicated service. At step 510 a network request 515 is created, such as a GET or a POST, and request 515 is sent to a root replica router for the service. The IP address of the root replica router is derived from the DNS name or address in the URL selected in step 505.

At step 535 the replica router matches all of the replica summary record entries in the replica routing database to the source IP address in message 515. Address matching of each replica summary record entry is performed based on the portion of each address that constitutes the network identifier according to the net mask contained in the entry. If no matches are found, control is transferred to step 562. If matches are found, at step 545 the N matching replica summary record entries that contain the best network performance metric values are selected and sorted by decreasing network performance metric value, and the IP addresses contained in the corresponding replica advertisement entries are made the candidate target IP addresses. Each entry in the candidate target IP address list includes a descriptor indicating whether it is a replica router or server replica (this information is determined from the entry's replica advertisement). The number N is a configuration parameter. Control then transfers to step 590.

At step 562 the replica router determines the network route and hop-by-hop delay to the client IP address in the header of message 515 using a utility such as traceroute. If the replica router already has the routing and performance information because of a previous execution of step 562 to the same client address it uses this information if the information is not older than a configuration-set maximum time.

At step 565 the IP address of each network router in the network route to the client is looked up in the replica summary records in the replica routing database, starting at the network router closest to the client. Matching is performed using the net mask in each replica summary record entry. If there are no matching entries in the replica routing database, then at step 575 a default set of pre-specified server replicas is made the set of candidate target IP addresses, and all of the default replicas are marked as server replicas. Control is then transferred to step 590.

If there are matching entries in the replica summary records in the routing database then at step 570 each matching replica summary record entry has its advertised network performance added to the network performance estimated from the client to the network router it matched. One way to estimate this performance is to take the round-trip performance observed from the replica router to the client and adjust for the round-trip performance from the replica router to the network router that matched. The N matching replica advertisement entries that contain the best aggregate network performance metric values are selected, and the IP addresses contained in these replica advertisement entries are made the candidate target IP addresses. Each entry in the candidate target IP address list includes a descriptor indicating if it is a replica router or server replica; this information is determined from the entry's replica advertisement. The N IP addresses are ordered by decreasing network metric merit. Control then transfers to step 590.

At step 590 a new URL is computed that consists of the URL sent in message 515 with its network address portion replaced by the IP address that is the highest on the candidate target IP address list. The new URL is sent back to the client in redirect message 595.

At step 596 the client processes the redirect. If the new URL points to a replica router, then the client will automatically start again at step 510 using a different replica router. One application of such a redirect is to redirect a client to a replica router that is behind a firewall that is specialized for server replicas in the client's intranet. If the new URL points to a server replica, then the server replica will return pages that contain relative links for all requests that can be serviced from the replica, and absolute links to a master server for all requests that need to be serviced by a master server. Relative links allow the client to carry the local server replica host name from request to request, as well as optional information such as a session identifier or digital receipt. Absolute links created by a server replica can encode similar information including session identifiers, and also always encode the IP address of the referring server replica, so that the master server can learn the IP address of the referring replica to enable the master server to redirect the client back to the referring replica once the master server has finished its specialized processing.

In an alternative implementation, network performance estimates are directly supported by the network routing service and can be used for replica routing. For example, certain proposed network routing procedures such as IDPR support network routing servers that can determine the expected network performance of a route between two specified IP addresses in an internetwork. This network service can be directly used in steps 535 to 570 or 575 to pick the server replica in the replica routing database with the best expected performance from the server replica's IP address to the client's IP address.

In an alternative implementation, every root replica router runs on the same computer as a server replica. In this implementation, when no server replica can be found for a particular client's IP address and network location, the replica router directly returns the requested information from its local server replica instead of redirecting the client.

Figure 5A:
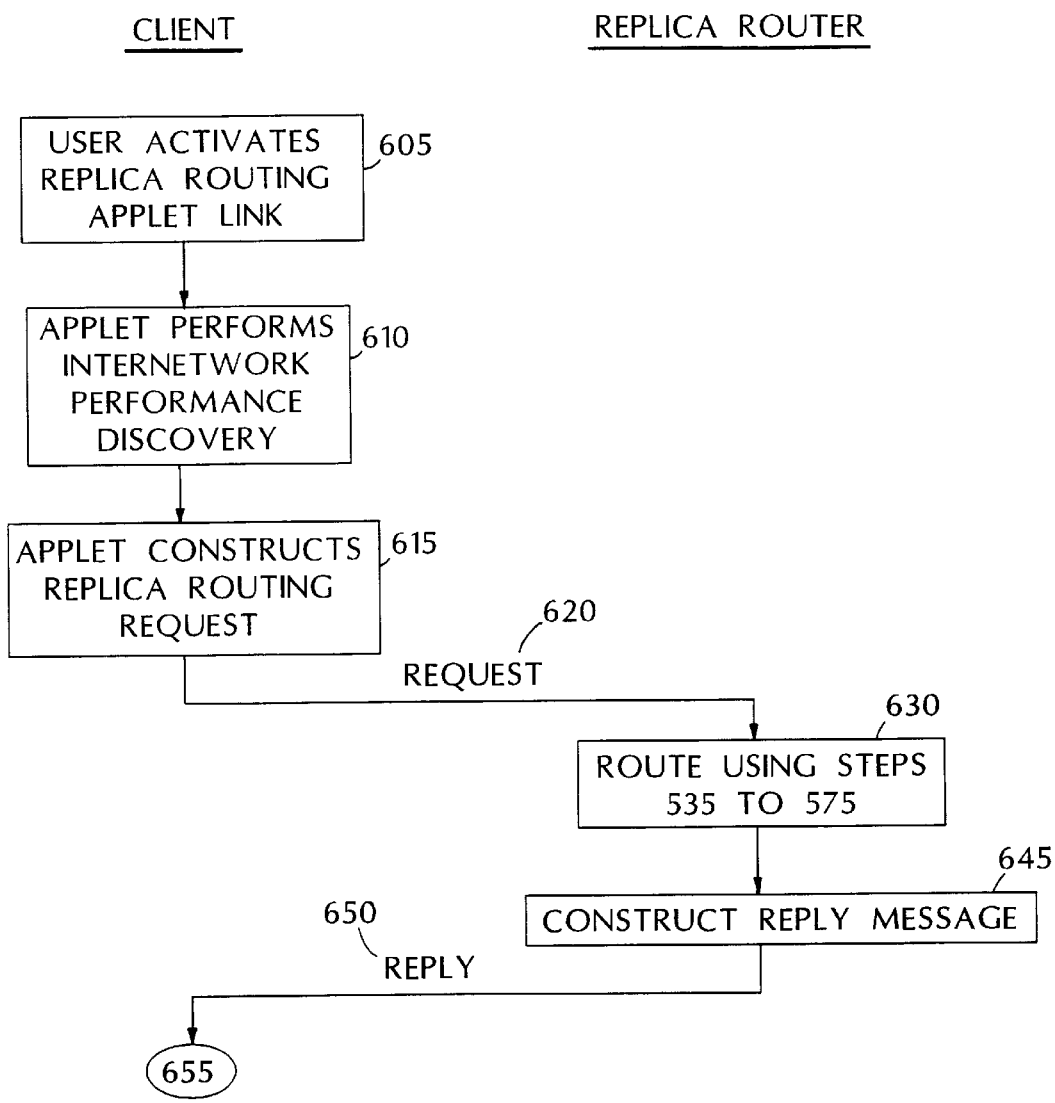
FIGS. 5a–5b is a flow chart illustrating the alternative processing of a client request to a replica router with the aid of a client replica routing applet.
Figure 5B:
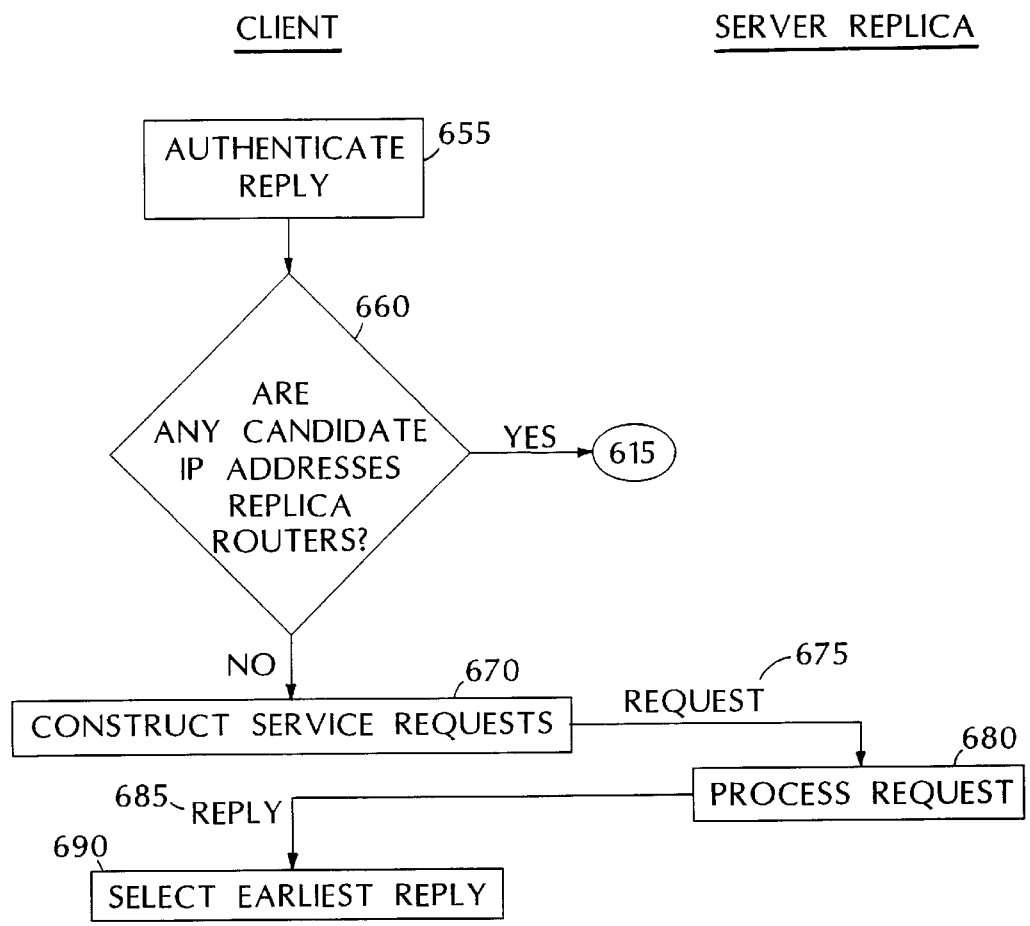

The flowchart in FIGS. 5a–5b shows how replica routing can be accomplished with client applets. In step 605 a user activates a link that describes a client applet that mediates access to the target behind the link. In step 610 the applet performs internetwork performance discovery as described in FIG. 6, and at step 615 the applet constructs and sends a replica routing request 620 to one or more root replica routers. The request constructed at step 615 includes the network performance table computed at step 610. Once a client performs step 610, this step does not need to be repeated for a configuration-set interval.

At step 630 a replica router uses the source IP address of message 620, and performs steps 535 to 570 or 575 from FIG. 4a to compute a set of candidate target IP addresses. In the place of step 562, the network performance table computed in step 610 and transmitted in message 620 is used to create an ordered list of network numbers reachable from the client in descending order of performance. These network numbers are looked up in the replica summary records in the replica routing database (step 565), and matching replica summary record entries result in an aggregate performance number being computed (step 570) from both the entry and the network performance provided by client message 620. The top N entries are used as candidate target IP addresses. Each entry in the candidate target IP address list includes a descriptor indicating whether it is a replica router or server replica (this information is determined from the entry's replica advertisement). If none of the networks in the network map in message 620 match replica summary records, then a default set of server replicas is used for the candidate target addresses (step 575).

Once the candidate target IP address list is computed at step 630 a reply message 650 is constructed at step 645 that includes the IP address list, performance metric values corresponding to each element of the list, an indication if each element of the list is a replica router or a server replica, a timestamp, and a service-specific digital signature, and at step 655 the digital signature is authenticated. At step 660, if the candidate IP addresses returned contain replica routers, then control returns to step 615 and the list of candidate IP addresses is expanded and sorted by performance metric value. Otherwise, at step 670 service requests corresponding to the original user action at step 605 are sent in message 675 to a fixed number of the server replicas having the best performance metrics. At step 680 a server replica processes the request, and in the page returned to the client inserts encoded relative links that will lead the client back, for subsequent requests, to the replica that provided the returned page. Reply messages 685 are received by the applet at step 690, and the earliest reply received is selected for processing in accordance with the original user action at step 605.

In an alternative embodiment, the client applet stores a list of all of the servers and replica routers offered in message 650, and, at step 670, simply constructs a single service request to the server replica or replica router having the best aggregate network performance metric value on the list. In the event that a server or replica router does not respond, the applet will return to the saved list to pick another server address or replica router address to try.

In yet another alternative embodiment, at step 510 or 615 the client constructs a replica routing request that is addressed to a predefined broadcast or multicast address. In this embodiment, replica routers listen for a broadcast or multicast request on this address at 515 or 620. Because multiple replica routers can respond to a broadcast or multicast request, the client can pick the first response, or the response that offers the server replica with the best estimated performance from the client's internetwork location.

Although a system has been described in which replica routers and server replicas all implement a single service (e.g., a single collection of information), generalizations to allow replica routers to function for multiple services can be made by one skilled in the art by introducing appropriate unique service identifiers in messages and database entries and modifying the logic above to include service identifiers.

Novel and improved apparatus and techniques for replica routing have been described herein. It is evident that those skilled in the art may now make numerous uses and modifications of and departures from the specific embodiment described herein without departing from the inventive concept. Consequently, the invention is to be construed as embracing each and every novel feature and novel combination of features present in or possessed by the apparatus and technique herein disclosed and limited solely by the spirit and scope of the appended claims.

What is claimed is:

1. An internetwork replica routing system comprising:

a plurality of server replicas, at least one replica router, and at least one client computer interconnected by a communications internetwork;

the client computer being programmed to cause a network request, including a source interwork address of the network request, to be transmitted over the communications internetwork;

at least one replica router being programmed to receive the network request and the source internetwork address of the network request and to calculate a performance metric value for each of at least some of the server replicas that specifies estimated communication performance between the client computer and the server replica, based upon the client computer's location in the internetwork as evidenced by the source internetwork address of the network request, and based upon a replica routing database that contains performance metric information with respect to a plurality of IP address portions sufficient to make routing decisions based upon the network request, and being programmed to cause the client computer to be directed to at least one server replica that is estimated to provide good performance based upon the client computer's location in the internetwork, the replica router selecting the at least one server replica to which it causes the client computer to be directed based on the performance metric values of the server replicas as calculated by the replica router, the replica router further being programmed to update dynamically the replica routing database based on internetwork performance information periodically received by the replica router in the form of advertisements, wherein the period of updates may dynamically change;

the server replica to which the client computer is directed being programmed to respond to the network request from the client computer.

2. The system of claim 1 wherein:

the server replicas are programmed to cause server replica advertisements to be sent to the replica router, the advertisements containing internetwork performance information from which the replica router can calculate the performance metric value; and the replica router is programmed to maintain a database computed from the server replica advertisements.

3. An internetwork replica routing system comprising:

a plurality of server replicas, at least one replica router, and at least one client computer interconnected by a communications internetwork;

the client computer being programmed to cause a network request, including a source internetwork address of the network request, to be transmitted over the communications internetwork;

at least one replica router being programmed to receive the network request and the source internetwork address of the network request and to calculate a performance metric value for each of at least some of the server replicas that specifies estimated communication performance between the client computer and the server replica, based upon the client computer's location in the internetwork as evidenced by the source internetwork address of the network request, and based upon a replica routing database, and being programmed to cause the client computer to be directed to at least one server replica that is estimated to provide good performance based upon the client computer's location in the internetwork, the replica router selecting the at least one server replica to which it causes the client computer to be directed based on the performance metric values of the server replicas as calculated by the replica router, the replica router further being programmed to update dynamically the replica routing database based on internetwork performance information periodically received by the replica router, wherein the period of updates may dynamically change, the server replica to which the client computer is directed being programmed to respond to a network request from the client computer; the server replicas being programmed to cause server replica advertisements to be sent to the replica router, the advertisements containing internetwork performance information from which the replica router can calculate the performance metric value; the replica router being programmed to maintain a database computed from the server replica advertisements;

wherein each of the replica advertisements contains the actual source IP address of the server replica that caused it to be sent, and at least one replica router is programmed to match source IP addresses accompanying the replica advertisements to the actual source IP address contained in the replica advertisements to determine whether any of the server replicas are located behind firewalls, and to select a server replica or another replica router to which it causes the client computer to be directed based on whether the client computer is located behind a common firewall with the server replica or another replica router.

4. The system of claim 1 wherein:

the server replicas are programmed to cause to be sent to the replica router a network performance table describing performance that can be expected between the server replica and certain network numbers; and the replica router is programmed to calculate the performance metric value for a server replica based upon the network performance table.

5. The system of claim 1 wherein the replica router is programmed to calculate the performance metric value of a server replica based upon the performance metric value of at least one network router located in a path from the client computer to the replica router.

6. The system of claim 1, wherein the client computer is programmed to cause the network request for access to the server replica to be sent to the replica router by multicasting or broadcasting the replica routing request over the communications internetwork.

7. The system of claim 1, wherein there are a plurality of replica routers arranged in a hierarchy, each of the replica routers being programmed to cause the client computer to be directed to a server replica that is estimated to provide good performance based upon the client computer's location in the internetwork by directing the client computer to a replica router lower in the hierarchy.

8. The system of claim 7 wherein:

at least one the replica routers is programmed to cause a replica router advertisement to be sent to a replica router higher in the hierarchy, the replica router advertisement containing information from which the replica router higher in the hierarchy can cause the performance metric value to be calculated; and the replica router higher in the hierarchy is programmed to store the replica router advertisement in a database of advertisements.

9. An internetwork replica routing system comprising:

a plurality of server replicas, a plurality of replica routers arranged in a hierarchy, and at least one client computer interconnected by a communications internetwork;

the client computer being programmed to cause a network request, including a source internetwork address of the network request, to be transmitted over the communications internetwork;

at least one of the replica routers being programmed to receive the network request and the source internetwork address of the network request and to calculate a performance metric value for each of at least some of the server replicas that specifies estimated communication performance between the client computer and the server replica, based upon the client computer's location in the internetwork as evidenced by the source internetwork address of the network request, and based upon a replica routing database, and being programmed to cause the client computer to be directed to at least one server replica that is estimated to provide good performance based upon the client computer's location in the internetwork, the replica router selecting the at least one server replica to which it causes the client computer to be directed based on the performance metric values of the server replicas as calculated by the replica router, the replica router further being programmed to update dynamically the replica routing database based on internetwork performance information periodically received by the replica router, wherein the period of updates may dynamically change, the server replica to which the client computer is directed being programmed to respond to a network request from the client computer;

at least one of the replica routers being programmed to cause the client computer to be directed to a server replica that is estimated to provide good performance based upon the client computer's location in the internetwork by directing the client computer to a replica router lower in the hierarchy;

at least one the replica routers being programmed to cause a replica router advertisement to be sent to a replica router higher in the hierarchy, the replica router advertisement containing information from which the replica router higher in the hierarchy can cause the performance metric value to be calculated; and the replica router higher in the hierarchy being programmed to store the replica router advertisement in a database of advertisements;

wherein the replica router higher in the hierarchy is programmed to match the replica router advertisement to its actual source IP address to determine whether the replica router that caused the replica router advertisement to be sent is located behind a firewall.

10. A method of replica routing in a communications internetwork comprising a plurality of server replicas, at least one replica router, and at least one client computer, comprising the steps of:

at the client computer, causing a network request, including a source internetwork address of the network request, to be transmitted over the communications internetwork;

receiving the network request, and the source internetwork address of the network request, at at least one replica router;

calculating, at the replica router, a performance metric value for each of at least some of the server replicas that specifies estimated communication performance between the client computer and the server replica, based upon the client computer's location in the internetwork as evidenced by the source internetwork address of the network request, and based upon a replica routing database that contains performance metric information with respect to a plurality of IP address portions sufficient to make routing decisions based upon the network request;

causing the client computer to be directed to at least one server replica that is estimated to provide good performance based upon the client computer's location in the internetwork, the at least one server replica to which the client computer is directed being selected based on the performance metric values of the server replicas as calculated by the replica router;

updating dynamically, at the replica router, the replica routing database based on internetwork performance information periodically received by the replica router in the form of advertisements, wherein the period of updates may dynamically change; and responding, at the server replica to which the client computer is directed, to the network request from the client computer.

11. The method of claim 10 further comprising the steps of:

at the server replicas, causing server replica advertisements to be sent to the replica router, the advertisements containing internetwork performance information from which the replica router can calculate the performance metric values; and the replica router maintaining a database computed from the server replica advertisements.

12. A method of replica routing in a communications internetwork comprising a plurality of server replicas, at least one replica router, and at least one client computer, comprising the steps of:

at the client computer, causing a network request, including a source internetwork address of the network request, to be transmitted over the communications internetwork;

receiving the network request, and the source internetwork address of the network request, at least one replica router;

calculating, at the replica router, a performance metric value for each of at least some of the server replicas that specifies estimated communication performance between the client computer and the server replica, based upon the client computer's location in the internetwork as evidenced by the source internetwork address of the network request, and based upon a replica routing database;

causing the client computer to be directed to at least one server replica that is estimated to provide good performance based upon the client computer's location in the internetwork, the at least one server replica to which the client computer is directed being selected based on the performance metric values of the server replicas as calculated by the replica router;

updating dynamically, at the replica router, the replica routing database based on internetwork performance information periodically received by the replica router, wherein the period of updates may dynamically change;

responding, at the server replica to which the client computer is directed, to the network request from the client computer;

at the server replicas, causing server replica advertisements to be sent to the replica router, the advertisements containing internetwork performance information from which the replica router can calculate the performance metric values; and the replica router maintaining a database computed from the server replica advertisements;

wherein each of the replica advertisements contains the actual source IP address of the server replica that caused it to be sent, and further comprising the step of matching, at the replica router, source IP addresses accompanying the replica advertisements to the actual source IP address contained in the replica advertisements to determine whether any of the server replicas are located behind firewalls, and to select a server replica or another replica router to which it causes the client computer to be directed based on whether the client computer is located behind a common firewall with the server replica or another replica router.

13. The method of claim 10 further comprising the steps of:

causing to be sent to the replica router a network performance table describing performance that can be expected between the client computer and certain network numbers; and calculating, at the replica router, the performance metric value for a server replica based upon the network performance table.

14. The method of claim 10 further comprising the step of calculating, at the replica router, the performance metric value of a server replica based upon the performance metric value of at least one network router located in a path from the client computer to the replica router.

15. The method of claim 10, further comprising the step of causing the network request for access to the server replica to be sent from the client computer to the replica router by multicasting or broadcasting the replica routing request over the communications internetwork.

16. The method of claim 10, wherein there are a plurality of replica routers arranged in a hierarchy, and the method further comprises the step of at least one of the replica routers causing the client computer to be directed to a server replica that is estimated to provide good performance based upon the client computer's location in the internetwork by directing the client computer to a replica router lower in the hierarchy.

17. The method of claim 16 further comprising the steps of:

causing a replica router advertisement to be sent from one of the replica routers to a replica router higher in the hierarchy, the replica router advertisement containing information from which the replica router higher in the hierarchy can cause the performance metric value to be calculated; and the replica router higher in the hierarchy storing the replica router advertisement in a database of advertisements.

18. A method of replica routing in a communications internetwork comprising a plurality of server replicas, a plurality of replica routers arranged in a hierarchy, and at least one client computer, comprising the steps of:

at the client computer, causing a network request, including a source internetwork address of the network request, to be transmitted over the communications internetwork;

receiving the network request, and the source internetwork address of the network request, at at least one replica router;

calculating, at the replica router, a performance metric value for each of at least some of the server replicas that specifies estimated communication performance between the client computer and the server replica, based upon the client computer's location in the internetwork as evidenced by the source internetwork address of the network request, and based upon a replica routing database;

the replica router causing the client computer to be directed to at least one server replica that is estimated to provide good performance based upon the client computer's location in the internetwork by directing the client computer to a replica router lower in the hierarchy, the at least one server replica to which the client computer is directed being selected based on the performance metric values of the server replicas as calculated by the replica router;

updating dynamically, at the replica router, the replica routing database based on internetwork performance information periodically received by the replica router, wherein the period of updates may be dynamically change; and responding, at the server replica to which the client computer is directed, to the network request from the client computer;

causing a replica router advertisement to be sent from one of the replica routers to a replica router higher in the hierarchy, the replica router advertisement containing information from which the replica router higher in the hierarchy can cause the performance metric value to be calculated;

the replica router higher in the hierarchy storing the replica router advertisement in a database of advertisements; and matching, at the replica router higher in the hierarchy, the replica router advertisement to its actual source IP address to determine whether the replica router that caused the replica router advertisement to be sent is located behind a firewall.

19. An internetwork replica routing system comprising:

a plurality of server replicas, at least one replica router, and at least one client computer interconnected by a communications internetwork;

at least one replica router being programmed to receive server replica advertisements, each of the advertisements containing at least one identifier of a network in the communications internetwork to be serviced by a server replica and internetwork performance information with respect to the network;

the client computer being programmed to cause a network request, including a source internetwork address of the network request, to be transmitted over the communications internetwork;

at least one replica router being programmed to maintain a database computed from the server replica advertisements, to receive the network request including the source internetwork address of the network request, and to cause the client computer to be directed to at least one of the server replicas based upon the relationship between the networks identified in the advertisements in the database and a network in which the client computer is located as evidenced by the source internetwork address of the network request, the replica router further being programmed to update dynamically the database based on server replica advertisements periodically received by the replica router in the form of advertisements, wherein the period of updates may dynamically change, the database containing performance metric information with respect to a plurality of IP address portions sufficient to make routing decisions based upon the network request;

the server replica to which the client computer is directed being programmed to respond to the network request from the client computer.

20. A method of replica routing in a communications internetwork comprising a plurality of server replicas, at least one replica router, and at least one client computer, comprising the steps of:

causing server replica advertisements to be sent to the replica router, each of the advertisements containing at least one identifier of a network in the communications internetwork to be serviced by a server replica and internetwork performance information with respect to the network;

at the client computer, causing a network request, including a source internetwork address of the network request, to be transmitted over the communications internetwork;

the replica router maintaining a database computed from the server replica advertisements;

receiving, at the replica router, the network request including the source internetwork address of the network request;

causing the client computer to be directed to at least one of the server replicas based upon the relationship between the networks identified in the advertisements in the database and a network in which the client computer is located as evidenced by the source internetwork address of the network request;

updating dynamically, at the replica router, the database based on server replica advertisements periodically received by the replica router, wherein the period of updates may dynamically change, the database containing performance metric information with respect to a plurality of IP address portions sufficient to make routine decisions based upon the network request; and responding, at the server replica to which the client computer is directed, to a network request from the client computer.

21. The system of claim 1 wherein the replica router is programmed to receive the internetwork performance information as a consequence of at least one message transmitted between the server replicas and the replica router.

22. The method of claim 10 wherein the replica router receives the internetwork performance information as a consequence of at least one message transmitted between the server replicas and the replica router.

23. An internetwork replica routing system comprising:

a plurality of server replicas, at least one replica router, and at least one client computer interconnected by a communications internetwork;

the client computer being programmed to cause a network request, including a source internetwork address of the network request, to be transmitted over the communications internetwork;

the replica router being programmed to receive the network request including the source internetwork address of the network request, and to calculate a performance metric value for each of at least some of the server replicas that specifies estimated communication performance between the client computer and the server replica based upon a replica routing database that contains performance metric information with respect to a plurality of IP address portions sufficient to make routing decisions based upon the network request, and to cause identification of a plurality of server replicas that are estimated to provide good performance to be sent to the client computer;

the client computer being programmed to perform empirical performance experiments to choose one of the plurality of server replicas, estimated by the replica router to provide good performance, from which to access information;

the server replica identified by the replica router and chosen by the client computer being programmed to respond to a network request from the client computer.

24. A method of replica routing in a communications internetwork comprising a plurality of server replicas, at least one replica router, and at least one client computer, comprising the steps of:

at the client computer, causing a network request, including a source internetwork address of the network request, to be transmitted over the communications internetwork;

at the replica router, receiving the network request including the source internetwork address of the network request, and calculating a performance metric value for each of at least some of the server replicas that specifies estimated communication performance between the client computer and the server replica based upon a replica routing database that contains performance metric information with respect to a plurality of IP address portions sufficient to make routing decisions based upon the network request, and causing identification of a plurality of server replicas that are estimated to provide good performance to be sent to the client computer;

at the client computer, performing empirical performance experiments to choose one of the plurality of server replicas, estimated by the replica router to provide good performance, from which to access information;

at the server replica identified by the replica router and chosen by the client computer, responding to the network request from the client computer.

25. A computer program product comprising: a computer usable medium having computer readable program code tangibly embedded in said computer program product, the program code being configured to cause a replica router to:

receive a network request, including a source internetwork address of the network request, the network request including the source internetwork address of the network request being transmitted over a communications internetwork of an internetwork replica routing system interconnecting at least one replica router, at least one client computer that causes the network request including the source internetwork address of the network request to be transmitted, and a plurality of server replicas programmed to respond to the network request from the client computer;

calculate a performance metric value for each of at least some of the server replicas that specifies estimated communication performance between the client computer and the server replica, based upon the client computer's location in the internetwork as evidenced by the source internetwork address of the network request, based upon a replica routing database that contains performance metric information with respect to a plurality of IP address portions sufficient to make routing decisions based upon the network request;

cause the client computer to be directed to at least one server replica that is estimated to provide good performance based upon the client computer's location in the internetwork, the replica router selecting the at least one server replica to which it causes the client computer to be directed based on the performance metric values of the server replicas as calculated by the replica router; and update dynamically the replica routing database based on internetwork performance information periodically received by the replica router in the form of advertisements, wherein the period of updates may dynamically change.

26. A computer program product comprising: a computer usable medium having computer readable program code tangibly embedded in said computer program product, the program code being configured to cause a replica router to:

receive a network request, including a source internetwork address of the network request, the network request including the source internetwork address of the network request being transmitted over a communications internetwork of an internetwork replica routing system interconnecting at least one replica router, at least one client computer that causes the network request including the source internetwork address of the network request to be transmitted, and a plurality of server replicas programmed to respond to a network request from the client computer;

receive server replica advertisements, each of the advertisements containing at least one identifier of a network in the communications internetwork to be serviced by a server replica and internetwork performance information with respect to the network;

maintain a database computed from the server replica advertisements;

cause the client computer to be directed to at least one of the server replicas based upon the relationship between the networks identified in the advertisements in the database and a network in which the client computer is located as evidenced by the source internetwork address of the network request; and update dynamically the database based on server replica advertisements periodically received by the replica router, wherein the period of updates may dynamically change, the database containing performance metric information with respect to a plurality of IP address portions sufficient to make routing decisions based upon the network request.

27. A computer program product comprising: a computer usable medium having computer readable program code tangibly embedded in said computer program product, the program code being configured to cause a server replica to cause server replica advertisements to be sent to a replica router over a communications internetwork of an internetwork replica routing system interconnecting a plurality of server replicas, at least one client computer, and at least one replica router, each of the advertisements containing at least one identifier of a network in the communications internetwork to be serviced by the server replica and internetwork performance information with respect to the network;

the client computer causing a network request for access to a server replica and a source internetwork address of the network request to be transmitted over the communications internetwork, and the replica router receiving the network request and the internetwork address; and the program code being configured to cause the server replica to respond to a network request, the network request including a source internetwork address of the network request being caused to be transmitted over the communications internetwork by the client computer and being received by the replica router, which maintains a database computed from the server replica advertisements, which causes the client computer to be directed to the server replica based upon the relationship between the networks identified in the advertisements in the database and a network in which the client computer is located as evidenced by the source internetwork address of the network request, and which updates dynamically the database based on server replica advertisements periodically received by the replica router, wherein the period of updates may dynamically change, the database containing performance metric information with respect to a plurality of IP address portions sufficient to make routing decisions based upon the network request.

28. A computer program product comprising: a computer usable medium having computer readable program code tangibly embedded in said computer program product, the program code being configured to cause a client computer to:

cause a network request, including a source internetwork address of the network request, to be transmitted over a communications internetwork of an internetwork replica routing system interconnecting at least one client computer, a plurality of server replicas programmed to respond to a network request from the client computer, and at least one replica router that calculates a performance metric value for each of at least some of the server replicas that specifies estimated communication performance between the client computer and the server replica based upon a replica routing database that contains performance metric information with respect to a plurality of IP address portion sufficient to make routing decisions based upon the network request transmitted over the communications request, and that causes identification of a plurality of server replicas that are estimated to provide good performance to be sent to the client computer; and perform empirical performance experiments to choose one of the plurality of server replicas from which to access information and to cause the information to be accessed from the server replica identified by the replica router and chosen by the client computer.

29. The system of claim 9 wherein the replica router higher in the hierarchy is programmed to cause the performance metric value to be calculated by redirecting the client computer to a server replica or replica router that is in turn programmed to cause the performance metric value to be calculated.

30. An internetwork replica routing system comprising:

a plurality of server replicas, at least one replica router, and at least one client computer interconnected by a communications internetwork;

the client computer being programmed to cause a network request, including a source internetwork address of the network request, to be transmitted over the communications internetwork;

at least one replica router being programmed to receive the network request including the source internetwork address of the network request and to select a server replica having a performance metric value better than at least some of the server replicas, the performance metric value being an estimate of communication performance between the client computer and the server replica, the replica router selecting the server replica based upon the client computer's location in the internetwork as evidenced by the source internetwork address of the network request, and based upon a replica routing database that contains a plurality of IP address portions sufficient to make routing decisions based upon the network request, the replica routing database being computed using performance metric information with respect to a plurality of IP address portions sufficient to make routing decisions based upon the network request, the replica router being programmed to cause the client computer to be directed to at least one server replica that is estimated to provide good performance based upon the client computer's location in the internetwork, the replica router further being programmed to update dynamically the replica routing database based on advertisements periodically received by the replica router, wherein the period of updates may dynamically change, the advertisements being computed based on internetwork performance information;

the server replica to which the client computer is directed being programmed to respond to the network request from the client computer.

31. An internetwork replica routing system comprising:

a plurality of server replicas, at least one replica router, and at least one client computer interconnected by a communications internetwork;

at least one replica router being programmed to receive server replica advertisements, each of the advertisements containing at least one identifier of a network in the communications internetwork to be serviced by a server replica, the advertisements being computed using internetwork performance information with respect to the network;

the client computer being programmed to cause a network request, including a source internetwork address of the network request, to be transmitted over the communications internetwork;

at least one replica router being programmed to maintain a database computed from the server replica advertisements, to receive the network request including the source internetwork address of the network request, and to cause the client computer to be directed to at least one of the server replicas based upon the relationship between the networks identified in the advertisements in the database and a network in which the client computer is located as evidenced by the source internetwork address of the network request, the replica router further being programmed to update dynamically the database based on server replica advertisements periodically received by the replica router, wherein the period of updates may dynamically change, the database containing a plurality of IP address portions sufficient to make routing decisions based upon the network request, the database being computed using performance metric information with respect to a plurality of IP address portions sufficient to make routing decisions based upon the network request;

the server replica to which the client computer is directed being programmed to respond to the network request from the client computer.

32. The system of claim 30 wherein the server replica is programmed to store information that it subsequently causes to be provided to the client computer when the server replica reponds to a network request from the client computer.

33. The system of claim 30 wherein the replica routing database contains a plurality of IP address portions sufficient to make routing decisions based upon the source internetwork address of a network request from the client computer.

34. An internetwork replica routing system comprising:

a plurality of server replicas, a plurality of replica routers, and at least one client computer interconnected by a communications internetwork;

the client computer being programmed to cause a first network request, including a first internetwork source address, to be transmitted over the communications internetwork;

a first replica router being programmed to receive the first network request including the first internetwork source address and to select a second replica router, and being programmed to cause a second network request including a second internetwork source address to be sent to the second replica router;

the second replica router selecting at least one server replica that is estimated to provide good performance based upon the client computer's location in the internetwork as evidenced by the second internetwork source address, the second replica router selecting the at least one server replica to which it causes the client computer to be directed based upon a replica routing database, the replica routing database being computer using performance metric information with respect to a plurality of IP address portions sufficient to make routing decisions based upon the second network request, the second replica router further being programmed to update dynamically the replica routing database based on internetwork performance information periodically received by the second replica router, wherein the period of updates may dynamically change, the at least one server replica to which the client computer is directed being programmed to respond to a network request from the client computer.

35. The system of claim 34 wherein the first replica router selects the second replica router based upon the first network request and based on the client computer's location in the internetwork as evidenced by the first internetwork source address.

36. The system of claim 35 where the first replica router selects the second replica router based upon another replica routing database computed using information from at least one BGP routing table.

37. The system of claim 34 wherein the second replica router causes an identification of a plurality of server replicas that are estimated to provide good performance to be sent to the client computer, and wherein the client computer is programmed to choose one of the plurality of server replicas from which to access information.

* * * * *

UNITED STATES PATENT AND TRADEMARK OFFICE
CERTIFICATE OF CORRECTION

PATENT NO.   : 6,052,718                                            Page 1 of 1
DATED        : April 18, 2000
INVENTOR(S)  : David K. Gifford It is certified that error appears in the above-identified patent and that said Letters Patent is hereby corrected as shown below:

Column 11,
Line 12, "the network request" should read -- a network request --.

Column 13,
Line 66, "the network request" should read -- a network request --.

Column 14,
Line 42, "the network request" should read -- a network request --.

Column 16,
Lines 2 and 51, "the network request" should read -- a network request --.

Column 18,
Lines 19 and 34, "the network request" should read -- a network request --.

Column 21,
Lines 2 and 42, "the network request" should read -- a network request --.

Signed and Sealed this

Eleventh Day of March, 2003

JAMES E. ROGAN
*Director of the United States Patent and Trademark Office*